Dec. 4, 1951 E. F. MacNICHOL, JR 2,577,536
AUTOMATIC RANGE TRACKING CIRCUIT
Filed May 5, 1944

INVENTOR.
EDWARD F MACNICHOL JR.
BY William D Hall
Attorney

Patented Dec. 4, 1951

2,577,536

UNITED STATES PATENT OFFICE 2,577,536

AUTOMATIC RANGE TRACKING CIRCUIT

Edward F. MacNichol, Jr., Boston, Mass., assignor, by mesne assignments, to the United States of America as represented by the Secretary of War Application May 5, 1944, Serial No. 534,310

1 Claim. (Cl. 343—7)

This invention relates to a communication system and particularly to an automatic range tracking portion of a radar system. Radar systems have been designed in which a directional antenna array may be trained upon a target and wherein means are provided for giving an indication of the instantaneous range of a selected target. Thus in anti-aircraft systems it is not only necessary to keep a target detecting system trained upon a certain target, but it is also necessary to control the effective range of fire, in accordance with variations of the range of the target.

In systems of this type, it has hitherto been the practice to provide a blocking gate ahead of and behind the desired target echo, the blocking gates being disposed with reference to time. The desired target echo has then been utilized as a source from which error voltages may be derived so that the system hunts continuously for the precise range corresponding to the target echo. As part of the system, the gating action has required variable width multivibrators and involved complicated circuits having precise and fast operating characteristics.

In comparison to the above, this invention merely requires a fixed gate whose position along the range axis is controlled by the derived error voltage. The target echo whose range is desired to be automatically and continuously indicated is framed or bracketed with this one gate.

Figure 1:
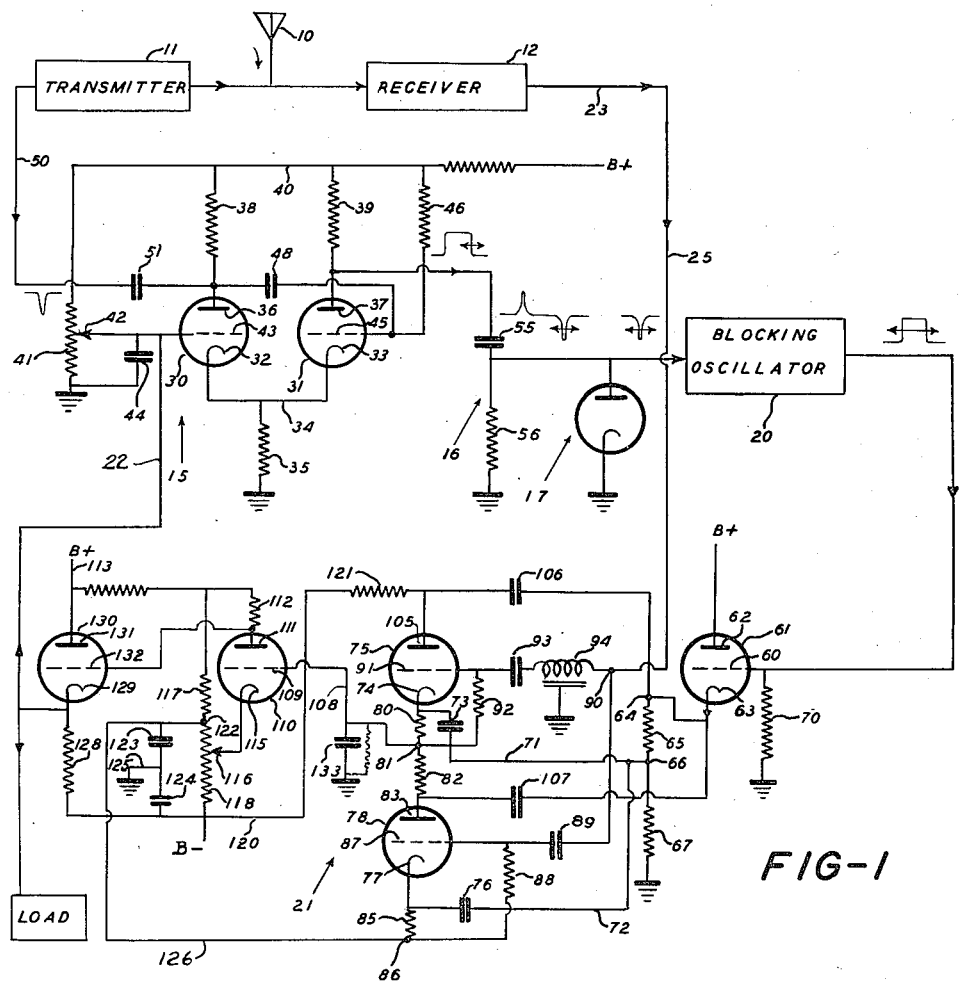
Figure 2:
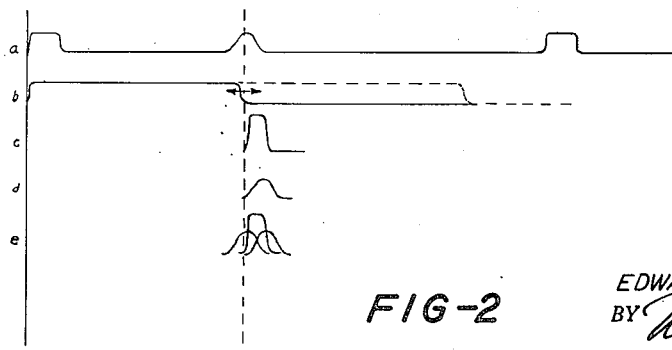

Reference will now be made to the drawing wherein Fig. 1 is a diagram partly in blocks and partly in wiring detail of a system embodying this invention; and Fig. 2 is a diagram showing the relationship of voltage curves in the system.

Inasmuch as the system is designed to be used with a conventional radar system having the usual transmitter, receiver and directional antenna, it will be unnecessary to describe such a system in detail. In general, the antenna system may be controlled by suitable mechanism, either manual or automatic, for training in azimuth and elevation upon a desired target. A transmitter may be connected to the antenna and supply the same with energy at periodic intervals determined by the pulse repetition frequency of the system. This transmitter may either be self-pulsed or be controlled by some suitable timer, all in a manner well known in the art. During the intervals between pulses, the receiver is effectively connected to the antenna and is adapted to receive target echoes.

Referring particularly to Fig. 1 now, an antenna system 10 of any suitable type is connected to a transmitter 11 and receiver 12 respectively. Antenna 10 may be of the type having a directional characteristic and, if desired, may have means for adjusting the azimuth and elevation. In accordance with usual practice, the means connecting transmitter 11, receiver 12 and antenna 10 may have suitable switching means for disconnecting or desensitizing the receiver during transmitter operation and may also have means for disconnecting the transmitter from the antenna during the intervals between transmitter operation. The latter is for the purpose of conserving energy received by the antenna and directing all such energy toward the receiver.

The transmitter may either be self-pulsed or may be controlled by a timer in accordance with usual practice and is adapted to send out a burst of energy for a short period of time and thence be quiescent for a comparatively long period of time and thereafter repeat the performance. Thus, as one example, the transmitter may have a pulse repetition frequency of between 1,000 and 2,000 periods per second and may be on for .5 microseconds, for example, and be off the rest of the period. These values are exemplary and may be greatly modified as desired.

Transmitter 11 has a line going to a variable delay circuit generally designated as 15 whose output is fed to a peaker 16 and thence onto a clipper 17 and then to a blocking oscillator 20. Blocking oscillator 20 supplies its output to a range tracking circuit which is generally designated by 21. Range tracking circuit 21 has a feedback connection 22 to delay circuit 15, while receiver 12 may feed its output through a line 25 to range tracking circuit 21.

Before describing the detailed circuits, a general description of the system will be given. Transmitter 11 is adapted, when it operates, to feed a trigger pulse to variable delay circuit 15. This trigger pulse trips delay circuit 15 into operation so that a sudden or steep voltage front is generated at a controlled time after the trigger pulse. The voltage curve generated by circuit 15 prior to the final steep front (for each cycle) is immaterial. As shown here, the output of circuit 15 is generally a rectangular voltage wave with steep leading and trailing voltage fronts. Circuit 15 may, however, generate an ordinary saw-tooth wave with a trigger pulse starting the saw-tooth and the saw-tooth breaking at a controlled time after the start. In any event, delay circuit 15 may be said to be initially triggered into an unstable condition and then stripped back suddenly to its stable condition. Delay circuit 15 would normally trip back to its original stable condition after a lapse of time corresponding to the interval between successive transmitter trigger pulses. However, in practice, delay circuit 15 is tripped back to its original stable condition ahead of time by a voltage in feedback 22 from the range circuit at a time when the desired target echo comes into the receiver. Delay circuit 15 may generate any kind of a delay voltage curve whose initial point coincides in time with a transmitter trigger pulse and which has a steep trailing edge normally coincident in time with a particular target echo. This delay voltage curve wave is peaked in circuit 16 and if necessary clipped in circuit 17 so that a pip corresponding in time to the steep trailing edge of the delay curve is left. This time, as pointed out before, is normally coincident with a selected target echo.

The final pip, fed into blocking oscillator 20, trips the oscillator off and results in a single calibrated gate. This gate preferably has a time duration of the order of about one-half the duration of the pulse of energy sent from the transmitter to the antenna. This is to be distinguished from the trigger pulse from transmitter 11 to delay circuit 15 which is as sharp as possible. The relationship above between gate and pulse duration is merely exemplary and may be varied as will be more fully set forth later. Assuming that the transmitter pulse to antenna 10 at each period has a duration of the order of about .5 microseconds, then the gate output from blocking oscillator 20 may be about .25 or .3 microseconds. This gate is fed to range circuit 21.

In general, range circuit 21 has impressed upon it the gate from blocking oscillator 20. This gate is impressed upon the anodes of a pair of vacuum tubes. The selected target echo is fed to one control grid of a tube, while the same echo delayed a short time is passed on to the grid of the second tube. The delay of this echo is preferably equal to or something less than the duration of the gate from blocking oscillator 20 and may, as an example, be something of the order of .2 microseconds, assuming the other figures given as examples are taken. The two vacuum tubes have their outputs impressed in opposed relationship on a condenser.

If the original and delayed target echoes are properly centered or framed in the gate, the average potential across the condenser will be zero or some other definite value depending upon actual circuit details. A direct current amplifier is controlled by the potential across this condenser, and the output of this amplifier is an error potential and is fed by line 22 back to delay circuit 15. The setting of this circuit is such that upon the proper framing of the delayed and original target echoes within the gate, the error potential fed back to delay circuit 15 causes it to generate a steep voltage front and return to its original stable condition in time with the reception of a desired target echo. In case the two echoes are unsymmetrical within the gate, then the tendency is for the direct current amplifier to shift the gate in a proper direction because of its control of delay circuit 15.

The delay circuit shown in 15 is merely an example and comprises a pair of vacuum tubes 30 and 31 having cathodes 32 and 33, respectively, connected by a lead 34. The two cathodes are biased above ground by a suitable cathode resistor 35. Anodes 36 and 37 may be connected through load resistors 38 and 39 to a B+ bus 40. Coming down from B+ bus 40 is a potentiometer resistance 41 whose lower end is grounded and with which a slider 42 cooperates. Slider contact 42 is connected to control grid 43 of vacuum tube 30. A condenser 44 is connected between control grid 43 and ground. The other tube 31 has its control grid 45 biased by means of a resistance 46 connected to bus 40. Control grid 45 is also connected through a coupling condenser 48 back to anode 36 of vacuum tube 30. Trigger input from transmitter 11 may be supplied by a wire 50 and coupling condenser 51 to condenser 48.

The operation of this delay system is as follows: Normally, control grid 45 is biased to a positive potential (here B+) so that vacuum tube 31 is conducting. When the entire circuit is in equilibrium, the space current through vacuum tube 31, by virtue of its conductance, results in a drop through resistance 35, and this drop raises the potential of cathodes 32 and 33 above ground. Movable contact 42 on potentiometer 41 is normally adjusted to such a point that control grid 43 is biased below cutoff with respect to cathode 32 of tube 30 on the basis of no-space current in tube 30. Hence the stable condition of the system maintains tube 31 in a conducting state and tube 30 in a non-conducting state.

Now assume that a negative trigger pulse from transmitter 11 comes in on wire 50. This pulse passes through condensers 51 and 48 and momentarily drops the bias of grid 45 of tube 31 below cutoff. It is understood, of course, that the magnitude of the trigger pulse is sufficient to accomplish this. The sudden cutoff of tube 31 results in a disappearance of the drop through resistance 35 since no space current for tube 31 is passing through it. This means that the potential of cathode 33 is pulled down sharply to ground. The potential of cathode 32 is also pulled down to ground, and control grid 43, which was below cutoff before, now is biased above cutoff. Space current through vacuum tube 30 thereupon results. This is the unstable condition. The charging of condenser 48 normally tends to restore the trigger circuit to a stable condition after a lapse of time depending upon the time constant of condenser 48 and resistance 46 principally. However, the time constant of the grid circuit is so adjusted that the return to stable condition normally would take about all the time between successive transmitter pulses. The feedback from range circuit 21 is applied to control grid 43 and tends to modify the common cathode bias for cutting tube 31 in at a suitable time.

Thus delay circuit 15, as disclosed herein, is a so-called one-shot multivibrator wherein a transmitter trigger trips the circuit to an unstable condition and a controlled potential from the range circuit 21 helps to trip the circuit back to its original stable condition at a set time. Any other circuit for generating a single steep voltage front at a controlled time after a trigger pulse may be used.

As shown in the drawing, and as well known, the voltage at anode 37 of vacuum tube 31 with respect to ground, of course, has a generally rectangular shape. This voltage may be fed to peaker 16, which, as shown here, consists of a condenser 55 and resistance 56, to ground. The time constant of this combination is small enough so that a sharp voltage pip is produced at each edge of the generally rectangular voltage output of the trigger circuit.

It is understood, of course, that the condenser resistance peaker may be replaced by any other well known device for peaking the output of delay circuit 15. As shown here, however, the output of the peaker is taken across resistance 56 and goes through clipper 17. This, in its simplest form, merely consists of a diode to by-pass pips of undesired polarity. As shown here, the undesired pips are positive and are diverted to ground as unnecessary. It is understood, of course, that the polarity is unimportant and that if necessary they may be reversed. However, it happens that the pip occurring at the time of the target echo is negative in character and is left to be passed on to blocking oscillator 20. The clipper may be omitted when the delay voltage curve has only one sharp voltage change as in a sawtooth.

Blocking oscillator 20 may be any one of the well known forms of devices for obtaining a calibrated voltage pulse. In its simplest form, such an oscillator, as shown, for example, on page 180 of "Ultra High Frequency Techniques," by Brainard, may generate one or more oscillations and then stop. Where one oscillation is generated, the output may be suitably shaped to provide a narrow, rectangular pulse. Where several oscillations are generated, suitable detecting means may be provided so that the envelope forms a substantially rectangular voltage pulse. Instead of a blocking oscillator, a calibrated, biased multivibrator may be used.

The output of blocking oscillator 20 is impressed upon control grid 60 of a vacuum tube 61 connected to function as a cathode follower. Vacuum tube 61 has its anode 62 connected to a suitable source of B+ potential, while its cathode 63 is connected to a junction point 64 between which and ground two load resistors 65 and 67 are disposed. Between control grid 60 of tube 61 and ground a suitable grid resistor 70 may be connected for the purpose of discharging the grid and stabilizing its potential.

Between load resistors 65 and 67 is a junction point 66 from which two leads 71 and 72 are taken. Lead 71 goes to a condenser 73 and thence to cathode 74 of vacuum tube 75. Similarly, lead 72 goes to a condenser 76 and thence to cathode 77 of vacuum tube 78. Cathode 74 of tube 75 is connected through bias resistor 80 to junction point 81 and thence to load resistor 82, to anode 83 of vacuum tube 78. Cathode 77 of tube 78 is connected through bias resistor 85 to junction point 86. Tube 78 has its control grid 87 connected to junction point 86 by a suitable grid resistor 88. Control grid 87 is also connected through a blocking condenser 89 back to junction 90. Vacuum tube 75 has its control grid 91 connected to junction point 81 by grid resistor 92, while the control grid itself is connected through blocking condenser 93 and delay line 94 to junction point 90.

Delay line 94 is adapted to provide a delay of a target echo by an amount determined by the duration of the blocking oscillator gate and the pulse transmitted by the transmitter to the antenna. As has been pointed out before, the object is to impress upon the grids of two opposed tubes the original and delayed target echo in such manner as to provide for symmetrical framing within the gate output of blocking oscillator 20. In the event of substantial attenuation in delay line 94, adjustment of the circuit elements may be made to compensate for this. Assuming the figures previously taken for the system, a suitable delay time for line 94 may be of the order of .2 microseconds. With such a short delay, a simple inductance having a certain amount of distributed capacitance may suffice. However, in the event that a longer delay is essential, the usual delay lines well known in the art may be provided. In any event, it is to be understood that the delay line indicated by 94 is merely exemplary.

Junction 90 is connected by line 25 to receiver 12. All target echoes received by antenna 10 may be indicated on a cathode ray tube, not shown.

Referring back to range circuit 24, tube 75 has its anode 105 connected back through a coupling condenser 106 to junction 64. Similarly, anode 83 of tube 78 is connected through a coupling condenser 107 back to junction 64. Junction point 81 is connected by lead 108 to control grid 109 of a D. C. amplifier 110. Amplifier 110 has its anode 111 connected through load resistor 112 to a source of B+ potential 113. Amplifier 110 has its cathode 115 connected to movable contact 116 of a series of resistances 117 and 118 connected between B+ line 113 and a line 120. Line 120 is connected through load resistor 121 to anode 105 of tube 75, while a line 126 is connected from junction 86 back to point 122, this being the junction between resistances 117 and 118. Junction 122 has two condensers 123 and 124 connected between it and line 120 with the connection between condensers 123 and 124 being grounded at 125.

Line 120 connected to the plate voltage return B is also connected through a load resistance 128 to cathode 129 of cathode follower 130, anode 131 being connected to a source of B+ potential 113. Control grid 132 of cathode follower 130 is connected back to anode 111 of amplifier 110.

Between line 108 and ground condenser 133 is connected, this condenser being the one whose average potential difference serves as the controlling force for determining the position of the range gate.

Under normal quiescent conditions, resistances 117 and 118 together with junction 122 and potential of slider 116 are so chosen that line 120 is normally somewhat negative with respect to junction point 81. Similarly, line 126 is adapted to be normally somewhat positive of junction point 81. In other words, over the operating range of potential of junction point 81, the above relations hold true in the absence of a gate on anodes 83 and 105 and an echo pulse on the corresponding control grids. With certain types of tubes, it is not necessary to impress a smaller gate on the cathodes to prevent conduction through the tubes in the absence of a target echo pulse on the corresponding control grid. With such tubes, leads 71 and 72 together with condensers 73 and 76 may be omitted.

In order to control a load in accordance with the range of a selected target, the voltage on line 22 may be used. Thus suitable servo means may be actuated.

As has been previously indicated, the preferred relationship of gate duration, transmitter pulse duration and delay imposed on a selected target is such as to provide for the overlapping of these pulses as shown. Thus by having the peak of a selected target echo pulse coincide with the leading edge of the voltage gate and having the delayed echo pulse coincide with the trailing edge of the voltage gate maximum error sensitivity is obtained. Those portions of the echo pulses outside the voltage gate are ineffectual for range control purposes. But a slight variation of the relative positions of gate and pulses will result in a large variation of net voltage available for range control. Since one pulse area under the gate represents one polarity and the other pulse area under the gate represents an opposite polarity for range control, it is clear that the relationship shown involves a maximum sensitivity. If the pulses were entirely covered by the gate, some shifting would be possible under the gate without a corresponding range control variation. While the target delay due to line 94 is somewhat less than the gate duration, there is some additional delay action in various parts of the circuit so that the figures in microseconds given here have actually worked out in practice.

Specifically, the operation of the range gate part of the system is as follows. The positive gate, originally due to blocking oscillator 20, appears at junction point 64, this gate being with reference to ground. From junction point 64 the gate is effectively impressed through condensers 106 and 107 upon anodes 105 and 83 of vacuum tubes 75 and 78 respectively. At the same time, from junction point 66, a smaller gate is impressed upon the cathodes of these two tubes. As pointed out before, this is unnecessary with certain types of tubes. The time constants of these circuits for impressing the gates upon the anodes and cathodes of tubes 78 and 75 are preferably large compared to the duration of a gate pulse but small in comparison to the period of one cycle of transmitter operation.

When a selected target echo pulse appears upon control grid 87, after going through blocking condenser 89, a current due to charging action of condenser 107 passes through tube 78 to the cathode and thence to ground. Load resistance 82 also conduits a current to wire 108 for condenser 133. Thus, after stabilization, the conducting condition of tube 78 permits condenser 107 to become charged to a certain potential and, disregarding tube 75 for the moment, also permits condenser 133 to be charged to a certain potential.

During the latter portion of the gate, however, a delayed target echo pulse causes tube 75 to conduct. When vacuum tube 75 is conducting, the potential across condenser 106 is similarly permitted to become more or less stabilized after a few transmitter cycles. When vacuum tube 75 conducts, condenser 133 is again connected in series with condenser 106 so that it is permitted to charge or discharge in accordance with circuit conditions. Preferably, the time constant of the circuit from ground through condenser 133 and back to ground is quite long in comparison to the period of a transmitter cycle and may be completed by leakage from wire 108 and other components to ground. The ideal situation would be if condenser 133 were small and had no leakage path for discharging. Then it would be charged or discharged partly or completely with each transmitter cycle as circuit conditions dictated. It is thus evident that junction point 81 has its potential first moved in one way by conduction of condenser charging current through tube 78 and then moved in the reverse sense by tube 75 when it conducts. By suitable control of the various resistances and condensers, it is possible to have the potential across condenser 133 vary in accordance with the symmetry or lack of symmetry of the echo pulses and gate. The succeeding two tubes 110 and 130 are merely direct current amplifiers with the voltage output for actually controlling range being taken across cathode 129 and ground.

The curves in Fig. 2 show the variation of voltage with respect to time. Thus, curve $a$ shows a pulse generated by the transmitter and radiated by the antenna with an echo returning after a predetermined length of time and a second pulse emitted. Curve $b$ shows the substantially rectangular voltage wave generated by delay circuit 15, this voltage wave being taken at anode 37. As shown by the dotted lines, circuit 15 would normally return to its stable condition after a certain length of time, the entire generally rectangular voltage wave indicating the unstable condition of the trigger circuit. Actually, because of the action of feedback in line 22, the delay circuit is returned to its stable condition normally at a time when a target echo is received. Curve $c$ shows the voltage gate generated by blocking oscillator 20, while curve $d$ shows a selected target echo as indicated at curve $a$ but delayed by line 94. Curve $e$ shows in superimposed form curves $c$ and $d$ together with the original selected target echo of curve $a$.

What is claimed is:

A pulse echo system comprising an antenna, transmitter to generate periodic energy pulses for radiation and receiver to receive target echoes following each pulse, a delay circuit having a normal stable condition, means for tripping said delay circuit when said transmitter operates so that said circuit assumes an unstable condition, said circuit being adapted to return to its stable condition over a period of time substantially equal to the time between adjacent transmitter pulses, said delay circuit being adapted to generate a delay voltage curve having a steep trailing edge when going through one cycle of operation, means controlled by the trailing edge of said delay circuit output for generating a voltage pulse having a time duration substantially equal to the duration of a transmitter pulse, a pair of three electrode vacuum tubes, means for impressing said voltage pulse upon the anodes of said vacuum tubes, means for impressing upon the control grid of one vacuum tube a target echo normally occurring at the same time as said voltage pulse, means for delaying said echo by a time substantially equal to the duration of said voltage pulse, means for impressing said delayed echo on said other control grid, means for combining the outputs of said tubes differentially to obtain a net voltage whose magnitude and polarity is a function of the relative position of said voltage pulse and said two echoes and means for impressing said net voltage upon said delay circuit in a manner to control the return of said delay circuit from its unstable to stable condition on succeeding cycles so that said system tends to maintain said two echoes symmetrical within said voltage pulse.

EDWARD F. MacNICHOL, Jr.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,304,545 | Clement | Dec. 8, 1942 |
| 2,403,975 | Graham | July 16, 1946 |
| 2,404,399 | Pickles | July 23, 1946 |
| 2,422,074 | Bond | June 10, 1947 |
| 2,433,667 | Hollingsworth | Dec. 30, 1947 |
| 2,445,584 | Ramo | July 20, 1948 |
| 2,495,753 | Mozley | Jan. 31, 1950 |